Patented Feb. 21, 1939

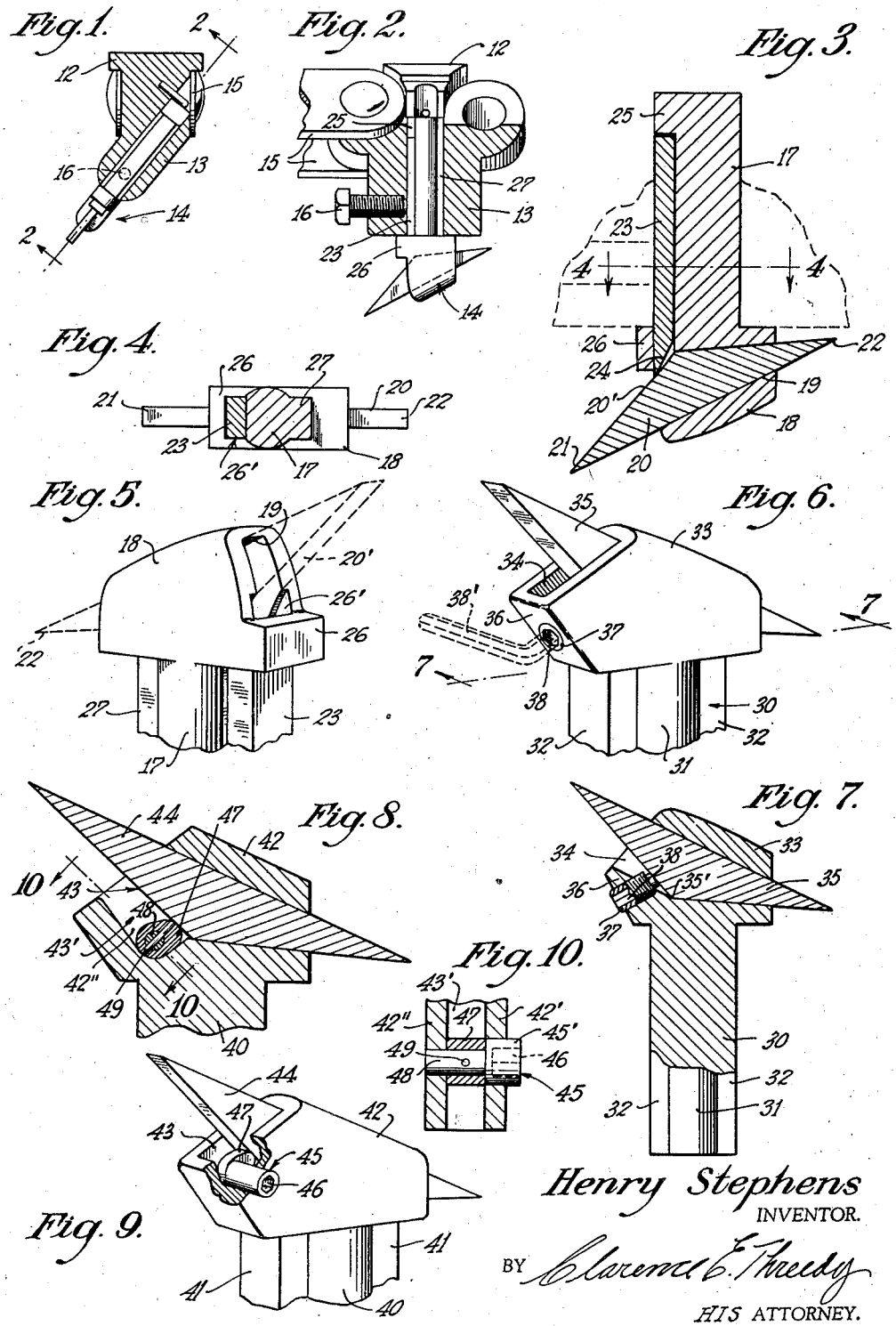

2,148,309

UNITED STATES PATENT OFFICE 2,148,309

MINING CUTTER

Henry Stephens, Oakland, W. Va.

Application November 5, 1937, Serial No. 172,942

13 Claims. (Cl. 262—33)

This invention relates to cutters and especially to cutters for use with mining machines of the chain type in which the cutting elements are removably secured in the links of the chain.

An object of the invention is the provision of a chain type cutter of the type set forth in United States Patent 2,090,012, utilizing a double pointed bit adapted to be reversibly seated in a chuck which is receivable in the socket of a cutting chain.

Another object of the invention is the provision of a cutter of the type described and which includes a chuck having a somewhat elongated shank receivable in a chain socket, the chuck having a transverse opening or bit seated near its outer end and into which the specially shaped bit is seated with its opposite ends exposed, and an elongated keeper plate which fits against the side of the shank and holds the bit in its seat.

A further object is the provision of a chuck having an elongated shank and keeper plate such as described, and which is provided additionally with a strap formed integrally with the shank and which surrounds the outermost end portion of the keeper plate, giving added strength to the cutter structure and making it possible to seat the cutter and particularly the shank portion thereof in chain sockets of varying depth.

Still another object is the provision of a cutter of the type described in which the chuck has an elongated shank with a transverse open-ended bit seat near one end and adapted to receive a double-ended cutting bit, together with a special locking stud which is threadable into the seat portion of the chuck to wedge the bit in place.

Still another object is the provision of a cutting tool having an elongated shank with a transverse open-ended bit seat near one end and a locking cam which may be turned through an over-center position into and out of wedging engagement with the bit to hold the latter in its seat.

Other novel aspects and objects of the invention reside in the particular form of construction and operation of the embodiments hereinafter described in view of the drawing, in which:

Fig. 1 is a transverse vertical section through an angular type cutting chain link and cutter;

Fig. 2 is a longitudinal vertical section through the link of Fig. 1 and is taken along lines 2—2 of the latter;

Fig. 3 is an enlarged vertical section through one form of cutting element;

Fig. 4 is an enlarged horizontal section through the cutter along lines 4—4 of Fig. 3;

Fig. 5 is an enlarged fragmentary perspective of the socket end of a chuck of the type shown in Fig. 3;

Fig. 6 is an enlarged fragmentary perspective of a modified form of cutter utilizing a screw thread wedge;

Fig. 7 is a vertical section through lines 7—7 of Fig. 6;

Fig. 8 is a fragmentary vertical section through the cam wedge type of cutter;

Fig. 9 is a fragmentary perspective of the cam wedge cutter of Fig. 8; while

Fig. 10 is a fragmentary section along lines 10—10 of Fig. 8 and taken through the cam wedge.

In Fig. 1, there is shown in section a socket link 12 having an angularly disposed socket portion 13 in which is removably secured a cutter 14, the link forming part of a chain 15 (Fig. 2), and the cutter being secured in the socket by means of a set screw 16.

The cutter assembly includes a chuck having an elongated shank 17 (Fig. 3) terminating at one end in an enlarged head portion 18 in which is formed a tapered transverse opening 19 providing a bit seat.

A preferred form of bit for use with the present cutter is of the shape shown in Fig. 3 and comprises a triangularly shaped element 20 of properly tempered metal and of isosceles form which may be inserted in the seat 19 with its opposite cutting points 21 and 22 protruding beyond the seat, the taper of the seat 19 being conformable to that of two adjoining sides of the triangular bit, so that the fit may be snug.

The bit 20 is secured in its seat by means of an elongated keeper plate 23 having one of its inner end portions 24 tapered slightly and adapted to bear against one of the isosceles edge portions 20' of the bit, the opposite end portion of the keeper abutting a boss 25 formed at the end of the shank 17 opposite the head 18.

An important feature of this embodiment of the invention is the retaining strap 26 which is formed integrally with the shank below the head portion 18 and opposite one side of the larger opening of the seat 19. The strap 26 as viewed in Fig. 4 provides a substantially rectangular opening 26' through which the tapered end portion 24 of the keeper 23 may be inserted to rest against the edge 20' of the bit, the opposite end of the shank 23 confronting the boss 25 with a limited amount of play to permit easy removal of the plate.

The cross section of Fig. 4 will illustrate the fact that the shank 17 is of partly circular section to fit into the cylindrical socket of the chain, opposite sides of the shank being provided with longitudinally extensive flanges, one of which is formed by the keeper plate 23 and the coextending boss 25 which is also of substantially rectangular cross section, while the other flange 27 (Figs. 2, 4 and 5) is formed integrally with the shank, and both of the flange formations 25—26 and 27 are received in opposite longitudinal slots in the socket of the link 13, so that the shank and cutter are secured against rotation in the chain link.

When the bit and chuck are assembled with the keeper plate as viewed in Fig. 3, they are slipped into the chain socket, and the set screw is turned up with its nose against the keeper plate 23 at a point spaced from the strap 26, and it may be observed here that because of the keeper strap 26 the depth of the socket in the chain link is not of controlling importance so far as the strength of the cutter assembly is concerned, for the strap takes up a good deal of the stress which is placed upon the keeper plate and thus relieves the load placed upon the set screw 16, the principal function of the latter being relegated to a secondary purpose in securing the shank in the link socket, it being observed that even were the screw 16 to become loosened, the keeper plate and strap would nevertheless secure the bit in the chuck for continued effective cutting so long as the chuck remained in the chain, with practically no change in the effectiveness of the keeper and strap in holding the bit in place.

In Figs. 6 and 7, there is illustrated a modified form of cutter having a shank 30 provided with a central portion 31 having cylindrical surfaces flanked by a pair of longitudinally extending keying flanges 32 corresponding to the flange 27 of Fig. 5 and the effective keying flange in the form of the keeper plate 23, the keeper plate being omitted entirely in the embodiment of Figs. 6 and 7.

The modified shank 30 is provided with a head 33 having a transverse opening 34 tapered so as to be larger at one end than the other to receive a triangularly shaped bit 35 substantially as in the case of the structure of Fig. 3. In contrast to the device of Fig. 3, the head portion 33 of the modified cutter has a screw seat portion 36 positioned in the general location of the strap 26 of the device of Fig. 3, and into this screw seat portion there is threaded a locking member 37 having a nose portion 38 which moves in a direction somewhat transversely of the bit seat opening 34 for engagement with one of the isosceles edge portions of the bit 35 at one side of the widest part 35' thereof, such that when the locking member 37 is threaded into position as seen in Fig. 7, the bit 35 is effectively blocked from movement out of the opening or seat 34.

The threadable locking member 37 is preferably provided with polyhedral bore 38 (Fig. 6) into which may be fitted a special key 38' for the purpose of threading the locking member into and out of locking position.

In Fig. 9, there is shown a cam type bit locking arrangement mounted in a cutter chuck similar to that shown in Fig. 7 and having a rounded or cylindrical shank portion 40 flanked by key flanges 41 and having a head 42 provided with a tapered transverse channel or opening 43 into which is seated a triangular bit 44 as in the case of the other structures. A stud shaft 45 having a polyhedral key bore 46 is rotatably mounted in the head portion 42 at a position to one side of the larger end of the tapered opening 43, and this shaft 45 has at its inner end a cam formation 47 which may be turned in a clockwise direction (Fig. 8) into a position out of the path of the cutting bit 44 as the latter is inserted in the seat portion of the chuck, the seat portion being enlarged for this purpose, as indicated at 43' in Fig. 8.

The open end of the bore 46 of the shaft 45 is exposed through a side of the head 42 for engagement by a key 38' (Fig. 6) by means of which the cam portion 47 may be turned into and out of camming engagement with the edge portion of the bit 44, it being observed that the cam and angular disposition of the edge of the bit are constructed to permit the cam to be forced past an over-center position to lock the bit in the chuck seat, neither the movement of the bit, vibration, nor other extraneous agencies being capable of turning the cam into unlocked position.

A preferred construction of the cam and shaft is particularly illustrated in Fig. 10 wherein it will be observed that the stud shaft 45 has an enlarged head portion 45' rotatably seated in one side 42' of the head, there being a reduced shaft portion 48 having bearing engagement in the opposite side 42'' of the head, the cam formation 47 being fitted on the reduced shaft portion 48 between the opposite wall portions 42' and 42'' and provided with a locking pin 49 extending through the shaft portion 48 into the cam so that the latter will rotate with the stud.

The appended claims are not intended to be restricted to the specific structure herein described for purposes of illustration, but are intended to embrace all equivalent forms and means coming within the spirit of the invention as defined by the claims in view of the specification and drawing.

Having thus described my invention, what I claim as new and desire to protect by Letters Patent is:

1. A cutting tool for cutting chains having a cutting tool socket, said tool comprising an elongated chuck having a tapered aperture therethrough, a boss spaced away from said aperture, a tapered cutting bit in said aperture, and a key plate positioned against said chuck with an end portion abutting said boss and an opposite end portion bearing against said bit, and integral body portions of said chuck extending around said end of the key plate adjacent said bit, said chuck and key plate being adapted to be mounted in said socket in the cutting chain.

2. A mining cutter comprising a shank having a tapered transverse opening near one end, a bit seated in said opening and having opposite edge portions extending from opposite ends of the opening, a keeper plate fitted against said shank and having an edge portion bearing against said bit and holding the latter in said opening, and an integral strap formation on said shank and surrounding said end portion of the keeper adjacent its bearing engagement with said bit.

3. A cutting tool comprising a chuck having an elongated shank with an enlarged head portion at one end, a transversely extending tapered opening through said head and providing a bit seat, a triangularly shaped bit mounted in said seat with opposite end portions extending beyond said head, an elongated keeper member fitted flush against said shank and having a particular end portion bearing against an edge of said bit, said shank having an integral strap formation extending around said particular end of the keeper adjacent its bearing engagement with said bit.

4. A mining tool including a tool holder having a bit seat formed therein, a bit fitted into said seat, a keeper fitted against said holder and having one end portion bearing against said bit to prevent removal of the latter from its seat, and a retaining strap on said holder and extending around said keeper in the region of the particular end thereof which bears against said bit to prevent movement of said particular end of the keeper away from the holder in the direction of withdrawal of the bit from said seat.

5. In a device of the class described, a cutting tool comprising a holder of substantially elongated form and having a recess extending in a generally transverse sense into the holder near an end thereof and constituting a bit seat, said bit seat opening into at least one side of said holder, a bit fitted into said seat, said holder having a keeper opening communicating into said seat and facing in the direction of the length of said holder, a keeper having a particular end portion fitted into said keeper opening to bear against said bit and prevent removal of the latter from the seat, said keeper opening being defined by parts of said holder which surround the end of the keeper fitted therein to prevent movement of the keeper laterally out of engagement with the bit, said keeper fitting substantially flush against the holder when said particular end portion thereof is inserted into the keeper opening as aforesaid, said holder having a boss disposed near the end thereof opposite said bit seat and adapted to confront the end of said keeper opposite the particular end thereof so as to limit movement of the keeper away from the bit in a direction parallel to the length of the holder when the keeper is in place, there being clearance allowed between said boss, said keeper, and the keeper opening to facilitate insertion and withdrawal of the keeper relative to the keeper opening and said boss.

6. A cutting tool adapted for mounting in a tool holding socket and comprising a chuck having an elongated shank with an enlarged head portion at one end, a transversely extending tapered opening through said head and providing a bit seat, a tapered bit mounted in said seat with opposite end portions extending beyond said head, an elongated keeper member fitted against said shank in assembled relation with the latter in said tool holding socket, and said keeper having a particular end portion bearing against said bit, said shank having an integral strap formation extending around said particular end of the keeper adjacent its bearing engagement with said bit, there being an integral boss arranged at the end of said shank opposite said head and providing an abutment confronting the end of said keeper member opposite said particular end thereof which bears against the bit, said boss being effective to prevent longitudinal movement of the keeper out of bearing engagement with the bit so long as the keeper remains in a predetermined fitted relation with the shank.

7. A cutting tool adapted for use with cutting chains having a cutter socket with transverse screw means for locking a cutter therein, said cutting tool comprising a chuck having an elongated shank receivable in said socket and provided at one end with an enlarged head portion having a transverse opening wider at one end than at the other and providing a bit seat, a cutting bit of isosceles triangular section insertable in said seat through the wider end thereof and adapted to have a cutting edge portion extended through the smaller open end thereof, an elongated keeper member fitted flush against said shank and having a particular end portion bearing against said bit at a point at one side of its widest portion disposed at the wider end of said opening, said shank having an integral strap formation extending around said particular end of the keeper close to the point of engagement with the latter of said bit, said shank and keeper being seated in said socket with said screw means bearing against said keeper to urge the latter against said shank.

8. A cutting tool adapted for use with cutting chains of the type having a tool socket and means engageable with a tool therein for locking said tool in place, said cutting tool comprising: a bit holder receivable in said socket and having a formation near one end providing a bit seat, a bit fitted into said seat, a keeper fitted against said holder and having a particular end portion bearing against said bit to prevent withdrawal of the same from its seat so long as the keeper and holder are in assembled relation, said holder being provided with a strap formation extending around said keeper in the region of said particular end thereof and arranged to prevent movement of said particular end of the keeper any substantial distance away from the bit, said holder and keeper being fitted in assembled relation into said socket and secured therein by the aforesaid locking means, said holder having a boss arranged to provide an abutment confronting the end of said keeper opposite said particular end thereof thereby to limit movement of said keeper in a direction away from said bit and out of said strap formation when the keeper and holder are in assembled relation as aforesaid.

9. A cutting tool for use with the cutter-chain type mining machine including a chain link having an elongated socket with oppositely disposed longitudinally extensive key channels and locking means movable in a direction transversely into one of said key channels, said cutting tool comprising: an elongated shank receivable in said socket and provided along one side with a flange formation receivable in a first one of said keying channels, said shank having a socket portion and a bit seated therein, an elongated keeper fitted against said shank with an end portion bearing against said bit and disposed on the side of the shank opposite said keying flange so as to fit in the second and opposite one of said keying channels in the socket, said locking means being moved against said keeper to urge the latter against said shank and prevent removal of the cutter from the socket, said shank further being provided with an integral strap surrounding said keeper close to the portion thereof which bears against said bit, said shank having a boss providing an abutment confronting the end of said keeper opposite said strap and adapted to prevent longitudinal movement of the keeper relative to said shank when the latter are in assembled relation, said boss being shaped to fit conformably with said keeper into the corresponding key channel in the chain socket as aforesaid.

10. A cutting tool including a holder having a bit receiving seat therein, a bit fitted into said seat, a keeper arranged and constructed to fit substantially flush against said holder and having a particular end portion bearing against said bit to prevent withdrawal of the latter from said seat, said holder being provided with strap means extending around said keeper in the region of said particular end thereof so as to substantially limit movement of the keeper away from said holder in the direction of withdrawal of the bit from said bit receiving formation, said holder having an abutment positioned at an end of said keeper opposite said particular end thereof to prevent substantial movement of the keeper away from the bit along the line of contact of the keeper with the holder.

11. A cutting tool including a holder having a bit receiving seat therein, a bit fitted into said seat, a keeper arranged and constructed to fit substantially flush against said holder and having a particular end portion bearing against said bit to prevent withdrawal of the latter from said seat, said holder being provided with strap means extending around said keeper in the region of said particular end thereof so as to substantially limit movement of the keeper away from said holder in the direction of withdrawal of the bit from said bit receiving formation, said holder having an abutment positioned at an end of said keeper opposite said particular end thereof to prevent substantial movement of the keeper away from the bit along the line of contact of the keeper with the holder, said holder and keeper being arranged and constructed to permit a limited freedom of movement of the keeper relative to said strap means and said abutment for the purpose of manipulating the keeper into and out of assembled relation with the holder and strap means.

12. A cutting tool for use in a holder having a tool socket, said tool comprising: an elongated shank adapted to fit into said tool receiving socket and having a bit-receiving seat near one of its ends, a bit fitted into said seat, an elongated keeper fitted flush against said holder with a particular end portion bearing against said bit to prevent removal of the latter from said seat, said holder having retaining means extending substantially around said keeper in the region of said particular end thereof and effective to limit movement of said particular end away from said holder in the direction of withdrawal of the bit from the seat, said keeper and holder fitting into said socket in the chain in such manner as to retain the keeper in keeping relation to the holder.

13. In a device of the class described, a cutting tool comprising a holder of substantially elongated form and having a recess extending in a generally transverse sense into the holder near an end thereof and constituting a bit seat, said bit seat opening into at least one side of said holder, a bit fitted into said seat, said holder having a keeper opening communicating into said seat and facing in the direction of the length of said holder, a keeper having a particular end portion fitted into said keeper opening to bear against said bit and prevent removal of the latter from the seat, said keeper opening being defined by parts of said holder which surround the end of the keeper fitted therein to prevent movement of the keeper laterally out of engagement with the bit, said keeper fitting substantially flush against the holder when said particular end portion thereof is inserted into the keeper opening as aforesaid.

HENRY STEPHENS.